Aug. 16, 1966  L. PERAS  3,266,468
WATER COOLING OF ROTORS OF ROTARY ENGINES
Filed March 11, 1964
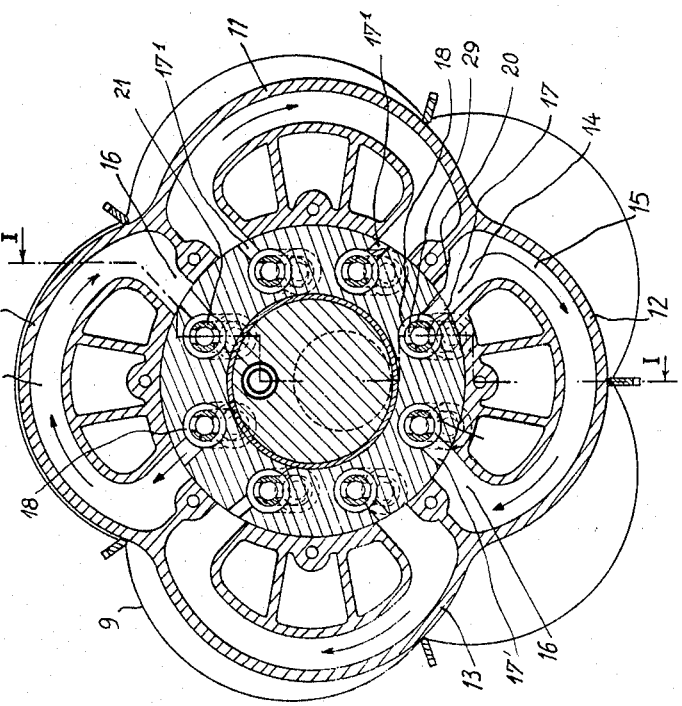
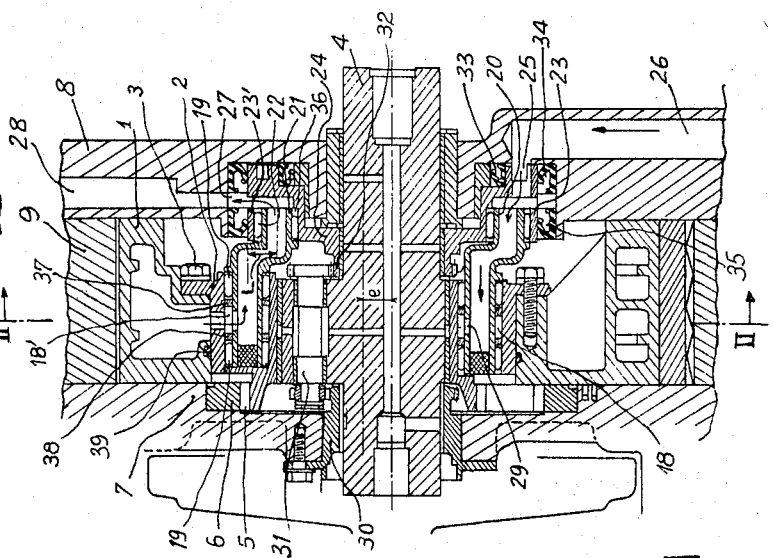
Inventor
Lucien Peras
By Stevens, Davis, Miller & Mosher
Attorneys

United States Patent Office 3,266,468
Patented August 16, 1966

3,266,468
WATER COOLING OF ROTORS OF ROTARY ENGINES
Lucien Peras, Billancourt, France, assignor to Regie Nationale des Usines Renault, Billancourt, France
Filed Mar. 11, 1964, Ser. No. 351,087
Claims priority, application France, Mar. 18, 1963, 928,364, Patent 1,359,797
4 Claims. (Cl. 123—8)

This invention relates in general to water cooling systems of engines and has specific reference to the water cooling of rotors of rotary engines.

It is known that the component elements of a rotary engine and more particularly the rotor are subjected to a heat flow and require specific arrangements for properly cooling these elements.

To this end oil may be circulated in the rotor, this solution being advantageous in that the same fluid is used for cooling the rotor and lubricating the crankshaft bearings, thus simplifying considerably the packing problem and reducing the number of auxiliary equipment. On the other hand, this arrangement is objectionable in that oil is a poor heat conducting fluid and as a result the dissipation of the heat absorbed by direct contact with the rotor wall is relatively poor in the solid rotor material and in spite of the use of a high-output pump and a large-area radiator it is most difficult to achieve the desired cooling efficiency.

It is the essential object of this invention to provide an improved arrangement adapted to ensure a satisfactory cooling of the rotor of a rotary engine by circulating water, i.e. a fluid much more convenient than oil for this purpose, with the advantage of reducing on the one hand heat stress and deformation to permissible values and on the other hand the temperature of the wall slidably engaged by the radial joints or like sealing means provided between the rotor and stator of the engine, thereby increasing considerably the useful life of these sealing means.

The bearings are lubricated by a conventional oil system which is no part of the present invention.

The water circulation circuit is so designed that any communication thereof with the oil system is definitely precluded, this particular feature being obtained by providing an additional connection between the rotor and stator which is completely independent of the bearings, and by making this communication completely fluid-tight.

The arrangement constituting the subject-matter of this invention as broadly set forth hereinabove will now be described in detail with reference to the accompanying drawing, in which:

FIGURE 1 is a fragmentary longitudinal section taken upon the line I—I of FIGURE 2, showing a rotary engine equipped with the water-cooled rotor according to this invention, and FIGURE 2 is a cross section taken upon the line II—II of FIGURE 1.

The rotary engine illustrated by way of example in the drawing is of the type comprising a four-lobed epicyclic rotor and a five-lobed stator having a conjugate contour, but it is clear that this invention is also applicable to any rotary engine having a rotor to which an epicyclic or hypocyclic motion is imparted, irrespective of the number of lobes thereof.

The rotor illustrated comprises two main members, i.e. an outer annulus 1 and a central hub 2, which are assembled by means of screws 3.

This rotor revolves about the eccentric or crankpin of the crankshaft 4 and is rotatably driven through teeth 5 cut in the hub 2 which mesh with the internally toothed gear 6 secured on the front plate 7 of the stator.

This stator also comprises a back plate 8 and a peripheral annular member 9 consisting of one or a plurality of component elements.

The outer annulus 1 of the rotor comprises four lobes 10, 11, 12 and 13. Each lobe consists of a hollow body or chamber having an inlet such as 14, a peripheral duct such as 15 and an outlet such as 16.

The inlet and outlet of each hollow body or chamber communicate respectively through ports such as 17, 17' with a bore 18, 18' formed in the hub 2.

Rotatably mounted on a pair of bearings 19 in each bore 18, 18' is one end of a water delivery pipe 20 or a water exhaust pipe 21 the other end of which is also rotatably mounted in a bearing 22 housed in a bore 23, 23' of an intermediate member 24 trunnioned on one journal of crankshaft 4.

This intermediate member 24 has formed therein a circular groove 25 communicating on the one hand directly with the water delivery duct 26 formed in the stator plate 8 and on the other hand with the aforesaid four water delivery pipes 20.

Besides, the four bores 23' formed in this intermediate member 24, in which the water exhaust pipes 21 are fitted, lead into cavities opening in turn at the outer periphery of said intermediate member 24 into the gap 27 forming a circular groove connected with the water exhaust duct 28 also provided in the stator plate 8.

The cooling fluid circulation path is clearly shown, by the arrows for each lobe.

Thus, the water fed into the delivery duct 26 flows through the groove 25 to delivery pipes 20, emerges therefrom through holes 29, and flows subsequently through the bore 18, port 17 and inlet 14 to circulate through the peripheral duct 15 of each lobe; then the water flows out through the outlet 16, through the passages 17', 18' to the outlet pipe 21, and is returned to the intermediate member 24 from which it flows into passages 27 and 28.

The pipes 20 and 21 are cranked tubular members of which the arm L has exactly the length of the throw of the eccentric about which the rotor is rotatably mounted.

This arrangement already known per se permits of driving the member 24 through the medium of pipes 20, 21 at the same speed as the rotor.

Optionally and with a view to eliminate any stress from these pipes, the intermediate member 24 may be driven at the rotor speed by means of an epicyclic train consisting of a fixed gear 30, the double planet wheel 31 carried by the crankshaft 4 and the sun wheel 32 machined in said intermediate member 24.

The water-tightness of the cooling circuit is obtained by means of packings 33, 34, 35, 36, 37, 38 and 39 of which the arrangement is clearly shown in FIGURE 1.

As already known, in a four-lobed rotary engine of the type illustrated there are two lobes (which are always the same) directly exposed to the explosion effects; therefore, it is reasonable to provide a more pronounced cooling of these two lobes with respect to the other two lobes. The arrangement according to this invention is particularly suited for obtaining this result, since the desired difference may be obtained by simply calculating accordingly the cross-sectional passage areas of the fluid delivery ducts or pipes which are independent of one another. Thus, assuming that lobes 11 and 13 are not exposed to the explosion effects, these lobes may be fed with cooling water through ducts $17_1$, $17'_1$ of smaller diameter, as shown in FIGURE 2.

I claim:
1. A water cooling system for a rotary engine of the cycloidal type, said system comprising a stator, a crankshaft journaled on the axis of said stator and carrying an eccentric, a rotor journaled on said eccentric and having a plurality of lobes, a cooling chamber in each lobe, an intermediate member carried by said stator coaxially to said crankshaft, a water inlet to and outlet from said stator, said inlet and outlet communicating with said intermediate member, a plurality of cranked pipes each having one end sealingly journaled in said intermediate member and communicating with said inlet and outlet, the other end of said cranked pipes journaled in said rotor and communicating with said cooling chambers, the throw of said cranked pipes corresponding to the distance between the axis of said eccentric and the axis of said crankshaft.

2. The system of claim 1 wherein said inlet and outlet each communicate with a groove formed in said intermediate member.

3. The system of claim 1 further comprising means to drive said intermediate member at the same speed as the rotor.

4. The system of claim 3 wherein said means is in the form of a epicyclic gearing comprising double planet wheels carried by said crankshaft, a fixed gear on which one of said wheels rolls, and a sun wheel cut on said intermediate member, with which the other of said wheels meshes.

References Cited by the Examiner

UNITED STATES PATENTS 2,871,831    2/1959    Patin _____ 230—145 X

MARK NEWMAN, *Primary Examiner.*

F. T. SADLER, *Assistant Examiner.*